United States Patent
Holzwarth et al.

(10) Patent No.: US 8,995,796 B2
(45) Date of Patent: Mar. 31, 2015

(54) SYSTEM FOR GENERATING A BEAT SIGNAL

(71) Applicants: Ronald Holzwarth, Munich (DE); Marc Fischer, Munich (DE); Michael Mei, Steinebach (DE)

(72) Inventors: Ronald Holzwarth, Munich (DE); Marc Fischer, Munich (DE); Michael Mei, Steinebach (DE)

(73) Assignee: Menlo Systems GmbH, Martinsried (DE)

( * ) Notice: Subject to any disclaimer, the term of this patent is extended or adjusted under 35 U.S.C. 154(b) by 67 days.

(21) Appl. No.: 13/724,023

(22) Filed: Dec. 21, 2012

(65) Prior Publication Data

US 2013/0163914 A1     Jun. 27, 2013

(30) Foreign Application Priority Data

Dec. 23, 2011 (DE) .......................... 10 2011 122 232

(51) Int. Cl.
| | |
|---|---|
| G02B 6/00 | (2006.01) |
| G02B 6/34 | (2006.01) |
| G02B 6/42 | (2006.01) |
| G02B 6/26 | (2006.01) |

(Continued)

(52) U.S. Cl.
CPC ................ G02B 6/26 (2013.01); H01S 3/2391 (2013.01); H01S 3/1304 (2013.01); H01S 3/1305 (2013.01); H01S 3/005 (2013.01); H01S 3/0078 (2013.01); G01J 9/04 (2013.01)
USPC .................. 385/11; 385/37; 385/39; 385/140

(58) Field of Classification Search
USPC ......... 385/11–13, 37, 27–29, 31, 39, 42, 123, 385/124, 140
See application file for complete search history.

(56) References Cited

U.S. PATENT DOCUMENTS

| 4,634,858 A | 1/1987 | Gerdt et al. |
| 5,136,669 A | 8/1992 | Gerdt |

(Continued)

FOREIGN PATENT DOCUMENTS

| DE | 196 33 428 A1 | 2/1998 |
| DE | 199 11 103 A1 | 9/2000 |

(Continued)

OTHER PUBLICATIONS

Office Action of the German Patent Office issued in German Application No. 10 2011 122 232.8 dated Oct. 1, 2012 (6 pages).

(Continued)

*Primary Examiner* — Akm Enayet Ullah
*Assistant Examiner* — Michael Mooney
(74) *Attorney, Agent, or Firm* — Flynn, Thiel, Boutell & Tanis, P.C.

(57) ABSTRACT

The invention relates to a system (1) for generating a (high-frequency) beat signal. The system has a first light source (3) with a multimode spectrum, a second light source (4) and a coupler and filter arrangement (5) with a first port (6) for coupling in light from the first light source (3), and a second port (7) for coupling in light from the second light source (4). Furthermore, a detector (11) is provided to which light of both light sources (3, 4) can be supplied. The coupler and filter arrangement (5) has a spectral filter (20, 28) for filtering out one or several modes from the spectrum of the first light source (3), and a first fiber-optical coupler (17, 23, 26) for coupling the light of the second light source (4) and the not yet filtered or the already filtered light of the first light source (3). The coupler and filter arrangement (5) is configured to be merely fiber-optical.

17 Claims, 6 Drawing Sheets

(51) Int. Cl.
*H01S 3/23* (2006.01)
*H01S 3/13* (2006.01)
*H01S 3/00* (2006.01)
*G01J 9/04* (2006.01)

(56) References Cited

U.S. PATENT DOCUMENTS

| | | | |
|---|---|---|---|
| 5,426,502 A * | 6/1995 | Miyata et al. | 356/477 |
| 6,785,303 B1 | 8/2004 | Holzwarth et al. | |
| 7,075,957 B2 | 7/2006 | Kallmann et al. | |
| 7,418,017 B2 | 8/2008 | Holzwarth et al. | |
| 2003/0142319 A1 | 7/2003 | Ronnekleiv et al. | |
| 2003/0223757 A1 | 12/2003 | Yamamoto et al. | |
| 2004/0136413 A1 | 7/2004 | Kallmann et al. | |
| 2006/0251424 A1 | 11/2006 | Nicholson et al. | |
| 2007/0071060 A1 | 3/2007 | Holzwarth et al. | |
| 2008/0285606 A1 | 11/2008 | Kippenberg et al. | |
| 2008/0310464 A1 | 12/2008 | Schneider | |

FOREIGN PATENT DOCUMENTS

| | | |
|---|---|---|
| DE | 100 44 404 C2 | 4/2002 |
| DE | 10 2004 022 037 A1 | 12/2005 |
| DE | 10 2004 037 549 A1 | 3/2006 |
| DE | 10 2005 035 173 A1 | 2/2007 |
| DE | 10 2007 025 037 B3 | 12/2008 |
| DE | 10 2008 062 139 A1 | 6/2010 |
| EP | 1 161 782 A1 | 12/2001 |
| EP | 1 258 718 A1 | 11/2002 |
| EP | 1 372 275 A1 | 12/2003 |
| EP | 1 988 435 A1 | 11/2008 |
| EP | 2 253 945 A1 | 11/2010 |
| JP | 02-257026 | 10/1990 |
| JP | 06-130247 | 5/1994 |
| JP | 2007-212427 A | 8/2007 |

OTHER PUBLICATIONS

Schroeder, T., Lemmerz, C., Reitebuch, O.: Frequency jitter and spectral width of an injection-seeded Q-switched Nd: YAG laser for a Doppler wind lidar; In: Appl. Phys. B 87, 437-444 (2007) (8 pages).

Reichert et al., "Measuring the frequency of light with mode-locked lasers;" Optics Communications 172, 59-68 (1999) (10 pages).

Extended European Search Report in the European Patent Office issued in European Appln. No. 12008504.8 dated Apr. 23, 2013 (7 pages).

* cited by examiner

SYSTEM FOR GENERATING A BEAT SIGNAL

FIELD OF THE INVENTION

The invention relates to a system for generating an electronic beat signal, normally in the form of a high-frequency signal, from two primary optical signals.

BACKGROUND OF THE INVENTION

High-frequency is here understood as an electromagnetic signal within a frequency range of approximately 1 kHz to circa 300 GHz; especially, or in a narrower sense, from 1 MHz to 10 GHz. Optical signals, however, are understood as electromagnetic signals within a frequency range of about 1 THz to 3000 THz. The latter frequency range does not only include visible light, but also infrared or ultraviolet light.

Such a system usually includes two sources of coherent light (laser) and an optical system for superimposing and filtering the two coherent light fields. The two sources of coherent radiation can each be continuous wave optical lasers or pulsed lasers or frequency combs. The continuous wave optical laser can be a gas, diode, fiber or solid state laser. The pulsed laser can be a gas, diode, fiber or solid state laser. The frequency comb can be generated by a short-pulse laser or by non-linear effects (e. g. microcombs according to EP 1 988 435 A1 or US 2008/0285606 A1) or by modulation of cw lasers or by optical rectification, difference frequency generation or other means.

A plurality of applications requires the stabilization of a laser onto a reference or the measurement of a laser against a reference. This reference can be an optical reference or a radio-frequency reference (i. e. high-frequency reference, such as an Rb- or Cs-atomic clock, an H-maser or a GPS-receiver). The optical reference can be another laser either at a nearly identical optical frequency or at a different optical frequency. In particular, the reference can be a laser locked to a stable high finesse cavity or to an optical transition of an atom, an ion or a molecule. In the first case, the two lasers are directly superimposed in a system and measured or stabilized. In the latter case, a frequency comb can bridge the difference of the two optical frequencies while preserving phase coherence. Here, two systems are advantageous, one for superimposing the optical reference with the frequency comb, and a second for superimposing the laser to be stabilized or measured with the frequency comb. In the stabilization or measurement against a radio-frequency reference, this serves to stabilize the frequency comb. The laser to be measured or stabilized is again superimposed with the frequency comb. Vice-versa, the frequency comb can be stabilized to an optical reference. For this, up to two systems are required for stabilizing the two degrees of freedom, i. e. repetition rate and offset frequency, of the frequency comb.

A system for generating a beat signal in the form of a high-frequency signal from two optical signals is described in DE 10 2004 037 549 A1. This system is designed for telecommunications engineering. The light of two pump lasers is irradiated into an optical wave guide in a direction opposite to that of the light of a signal laser. In the process, side bands are obviously formed which are supplied to a photodiode and measured there.

US 2003/0223757 A1 describes a system for generating an RF frequency standard (RF stands for radio frequency, i. e. high frequency). Here, the light of a cw laser is modulated to generate an optical frequency comb. In two separate paths, one frequency component each is filtered out from the frequency comb. By means of these two filtered-out frequency components, an RF beat signal is generated by superimposition on a detector.

JP 02257026 A and DE 196 33 428 A1 each disclose optical systems where light of a tunable light source is superimposed by measuring light of unknown frequency components. DE 196 33 428 A1 suggests a depolarizer for the tunable light. JP 02257026 A suggests using the high-frequency signal for measuring the frequency stability of a laser.

US 2006/0251424 A1 discloses a further arrangement for generating RF beat signals. Here, a frequency comb is generated, for example, in an optical fiber subsequently treated by generating a Bragg grating, and superimposed with the line of a further laser for generating a beat signal.

Frequency stabilization of frequency comb generators using high-frequency beat signals is described in DE 100 44 404 A1, DE 10 2005 035 173 A1, and DE 199 11 103 B4 as well as in EP 1 372 275 B1. As frequency comb generator, a short-pulse or ultrashort-pulse oscillator is provided there, i. e. a mode-coupled laser with pulse durations within a range of femto- (fs) to nanoseconds (ns). If one performs a Fourier transformation from the time domain to the frequency domain, a "frequency comb" corresponds to the series of laser pulses in the frequency domain. It is composed of a plurality of sharp, δ-like functions at different discrete frequencies, referred to as modes $f_n$. Adjacent modes have a distance $\Delta f$ from each other which exactly corresponds to the pulse repetition rate (=repetition rate) of the oscillator and which is therefore determined by the optical path length of the pulses in the oscillator.

However, the modes of the frequency comb are normally not exactly an integral multiple of $\Delta f$, but the complete frequency comb is shifted by a so-called offset frequency $f_0$. Mathematically, the frequency comb can therefore be described as $f_n = f_0 + n\Delta f$. The origin of the offset frequency $f_0$ consists in the group velocity for the pulses circulating in the oscillator, which determines the repetition rate and thereby the mode distance $\Delta f$, differing from the phase velocity of the individual modes.

In DE 199 11 103 A1, EP 1 161 782 B1, and DE 100 44 404 C2, methods are described by which the two degrees of freedom of the frequency comb, i. e. the offset frequency $f_0$ and the mode distance $\Delta f$, can be fixed or set to fixed values. To this end, one stabilizer or control loop each is provided. A first stabilizer relates to the mode distance. As a measured value for this stabilizer, the pulse repetition rate (optionally divided into or multiplied to ranges that can be better detected) can be used which corresponds—as illustrated—to the mode distance. An evaluation and comparison unit compares the measured value with a given reference value for the pulse repetition rate. To change the mode distance or to adjust it to the given reference value with the deviation being fixed, the stabilizer controls an actuator which changes the optical path length of the oscillator and thus the pulse repetition rate. For example, the actuator can be a linear drive or a piezo actuator for a resonant cavity mirror of the oscillator.

A second stabilizer controls the offset frequency $f_0$ to a certain value. For this purpose, a certain mode $f_n$ of the frequency comb is superimposed on a detector (e. g. a photodiode or a photomultiplier) either with an external, exactly known reference frequency (e. g. from a continuous wave optical laser) or with a frequency-doubled mode from the same frequency comb. The superimposition generates a beat frequency in the radio-frequency range on the detector. An evaluation and comparison unit compares the beat frequency with a given, optionally variably adjustable reference frequency. If a deviation is detected, the second stabilizer controls an actuator which changes the difference between the phase and group delay time in the oscillator. This can be accomplished, for example, by slightly tipping an end resonant cavity mirror in a resonant cavity branch through which the modes pass separately to change the optical path length of the oscillator depending on frequency. As an alternative, the pumping power for the oscillator could be changed, or a dispersive element, such as a pair of prisms or a transparent tilting plate, could be inserted into the beam path of the oscillator and its position could be changed. Especially in a fiber laser any change of the optical power circulating inside the laser cavity will serve to adjust the offset frequency.

With the means described in DE 199 11 193 A1, EP 1 161 782 B1, or DE 100 44 404 C2, altogether a completely stabilized frequency comb is generated whose individual modes are at exactly known frequencies and coherent with respect to each other. In view of the detailed description of these means, reference is made to the three mentioned documents.

DE 10 2007 025 037 B3 discloses a method for determining a frequency and/or phase difference, DE 10 2008 062 139 A1 a method for providing a reference frequency from beat signals, DE 10 2004 022 037 A1 a method for generating a frequency comb with offset-free frequencies, EP 1 258 718 A1 a system for measuring a group velocity dispersion, and JP 06130247 A an optical assembly in which a frequency shifter in a ring fiber takes care that frequency-shifted light can be superimposed by the original light into a beat signal.

Moreover, methods for generating such a beat signal in a free-beam assembly are already known (Reichert et al., Optics Communications 172, 59-68 (1999)).

SUMMARY OF THE INVENTION

It is the object of the present invention to provide, with a setup as simple as possible, a system for generating a beat signal which is, compared to prior art, more robust in view of environmental influences, offers a higher signal-to-noise ratio (SNR) with identical input parameters, and can preferably also work at low optical input powers.

This object is achieved by a system for generating a high-frequency signal and advantageous further developments of the invention.

The system according to the invention comprises a coupler and filter arrangement with a first port for coupling in light from a multimode light source (i. e. a light source with several spectral, optical or longitudinal modes, e.g. a frequency comb source) and a second port for coupling in light from a second light source which can be a light source of unknown wavelength or frequency, or a tunable light source or an optical reference of known frequency or any single frequency cw laser. The coupler and filter arrangement comprises a spectral filter for filtering out one or several modes from the multimode spectrum of the first light source, and a first fiber-optical coupler for coupling the light of the second light source with the either still unfiltered or already filtered light of the first light source. The coupler and filter arrangement supplies the superimposed light of the first and second light sources to a detector on which a beat signal in the form of a high-frequency signal is formed. The frequency of the high-frequency signal is the difference frequency of the two frequencies of the first and second light sources. The sum frequency of the two primary optical signals is so high that it cannot be detected by common detectors, for example photodiodes.

According to the invention, the coupler and filter arrangement is configured fiber-optically; i. e. the coupler and filter arrangement, including the spectral filter and the first fiber-optical coupler, does not comprise any free-beam paths between the incoupling and outcoupling points and the fiber-optical elements, and between the fiber-optical elements of the coupler and filter arrangement, between the two ports for coupling in light from the first and the second light sources and at least up to an outcoupling point where the superimposed primary optical signals leave the coupler and filter arrangement together in the direction of the detector. Fiber-optical elements can also comprise those elements having micro-optics and internal free-beam paths. Thereby, the system according to the invention becomes very robust, maintenance-free and very efficient (i. e. having a high signal-to-noise ratio).

Typical applications of the system according to the invention are the stabilization of one or several lasers at different optical frequencies relative to each other or relative to an optical or radio-frequency reference, the measurement of lasers against a radio-frequency reference derived from the definition of the SI second, and the generation of stable radio frequencies by transferring the stability of an optical reference to the radio-frequency range. The optical references can serve for a new definition of the SI second (optical clock).

It is particularly advantageous to also couple the detector fiber-optically to the coupler and filter arrangement, i. e. to have no more free-beam path also between the coupler and filter arrangement and the detector. This renders the complete system including the detector even more compact and robust.

In favor of a preferably high signal-to-noise ratio in the generation of the high-frequency signal, it proved to be advantageous for the spectral filter to comprise a reflecting spectral filter or for the spectral filter to be such a reflecting spectral filter because the filtered light thereby becomes very narrow-band, i. e. comprises only one or few modes. A fiber Bragg grating (FBG) proved to be particularly suited for this purpose and moreover has the advantage that it can be ideally included in the fiber-optical configuration of the coupler and filter arrangement. The light transmitted from the reflecting spectral filter can be reused for generating further beat signals in a cascading arrangement of systems according to the invention.

In addition or as an alternative to a reflecting spectral filter, the spectral filter could, however, also comprise a transmitting spectral filter, for example a Wavelength Division Multiplexer (WDM) or Optical Add-Drop Multiplexer (OADM) known from telecommunications engineering, if this is considered to be advantageous, for example for beam control reasons.

In a preferred embodiment, the coupler and filter arrangement comprises an optical circulator so that the beam control in the coupler and filter arrangement becomes even more efficient. In particular when fiber Bragg gratings are used that transmit a wide spectrum but reflect a narrow spectral band (the signal light), the use of a circulator makes sense.

This optical circulator could be disposed, for example, between the first fiber-optical coupler and the spectral filter, and simultaneously between the spectral filter and the detector to be passed twice, namely once by the unfiltered light from the fiber-optical coupler to the spectral filter and subsequently by the filtered light between the spectral filter and the detector.

In certain configurations of the system according to the invention, in addition to the first fiber-optical coupler, a further fiber-optical coupler can also be provided which is also included in the complete fiber coupling of the coupler and filter arrangement.

If an optical circulator and/or a second fiber-optical coupler is provided, it is favorable with respect to the complete fiber-optical configuration of the coupler and filter arrangement to have an output of the optical circulator or the second fiber-optical coupler lead to the spectral filter.

In view of the light efficiency in particular of the signal of the second light source, and in view of a preferably good signal-to-noise ratio (SNR), it is very advantageous if between the second port, i. e. the port for coupling in light of the second light source into the coupler and filter arrangement, and the detector only one single fiber-optical coupler is arranged so that the signal of the second light source is not excessively weakened by the passing of several fiber-optical couplers.

The system according to the invention could furthermore comprise at least one variable attenuator and/or variable amplifier. These attenuators or amplifiers, respectively, can be disposed in the coupler and filter arrangement, or else outside the coupler and filter arrangement. They can be provided and designed both for the light of the first light source and for the light of the second light source. By means of these variable attenuators and/or variable amplifiers, the intensities of the signals of the first light source and the second light source can be matched, at their arrival at the detector, as close as possible, and in an ideal case even be completely matched to achieve a particularly high SNR of the generated high-frequency signal.

The system could also comprise at least one frequency shifter, preferably an acousto-optical frequency shifter. It might occur that the observed beat signal is very close to 0 Hz or at half the distance of adjacent modes of the first light source (frequency comb) and thus becomes unusable for evaluation. In this case it makes sense to shift the light of the first or the second light source with an e. g. acousto-optical frequency shifter and to generate the beat signal only after shifting. The beat signal is here shifted by the value adjusted at the acousto-optical frequency shifter. If the frequency adjusted at the acousto-optical frequency shifter is used as control element for the phase stabilization of the laser, the high bandwidth of the acousto-optical modulators moreover permits a very quick control with correspondingly small deviation (tight lock). The frequency shifter can have the advantage of shifting the frequency of the light by a defined amount to thus be able to further improve the signal-to-noise ratio (SNR) on the detector.

Frequency multiplication and frequency doubling by additional non-linear steps would also be conceivable if thus a spectral overlap between the light sources can be produced.

Further improvement can be achieved by providing at least one polarization controller in particular in front of the start of a polarization-maintaining (PM) fiber. By this polarization controller, the polarizations of the optical signals of the first and second light sources can be matched which also improves the SNR. At the transition from non PM to a PM fiber (PM=polarization maintaining), a fiber optic polarization splitter (having on the input side a non PM fiber, on the output side two PM fibers, with light from the input fiber being decomposed into the two polarization axes) can be used. This device is also convenient for adjusting the polarization controller; the amount of light on the second axis can be minimized in order to transmit all light into the first fiber with the correct polarization.

In an advantageous version of the optical arrangement, all fibers employed in the coupler and filter arrangement are polarization-maintaining fibers (i. e. so-called PM fibers), possibly except for the fiber leading to the outcoupling point and optionally further to the detector for which a non-polarization-maintaining fiber can also be employed. In particular, at least the input fibers to the coupler are PM. The advantage of polarization-maintaining fibers consists in an improved signal-to-noise ratio (SNR) and an increased stability because only light of the same polarization contributes to the generation of the beat signal, while other polarization contributions increase noise and reduce contrast. In non-polarization-maintaining fibers, the polarization of the light changes due to environmental influences, such as temperature and the position of the fiber, leading to a changing SNR and thus a reduced stability and contrast.

It is ideal if a variable attenuator, a variable amplifier, a frequency shifter and/or a polarization controller is provided for light of the first light source and/or light of the second light source. This permits to minimize noise of the beat signal on the detector or to achieve a particularly high contrast of the signal on the detector. For this contrast becomes particularly high if mode-adapted light (i. e. primary optical signals of the same spatial modes, as are given in a fiber-coupled system) of a preferably similar intensity and preferably similar polarization, ideally of identical intensity and identical polarization, are superimposed on the detector. The variable attenuators, the variable amplifiers, frequency shifters and polarization controllers permit to optimally meet these conditions for high contrast or low noise in particular in connection with the use of polarization-maintaining fibers.

The variable attenuator, the variable amplifier, the frequency shifter and/or the polarization controller can then be disposed either each in front of one of the first or second ports, i. e. before the light of the first or second light source, respectively, enters the coupler and filter arrangement, or they can be disposed within the coupler and filter arrangement. The latter case has the advantage that the optical elements, such as the attenuator, the amplifier, the frequency shifter and/or the polarization controller, can also be included in the completely fiber-optical configuration of the coupler and filtercoupler and filter arrangement.

BRIEF DESCRIPTION OF THE DRAWINGS

Below, advantageous embodiments of the invention will be illustrated more in detail with reference to a drawing. The figures show in detail.

DETAILED DESCRIPTION OF THE INVENTION

Figure 1:
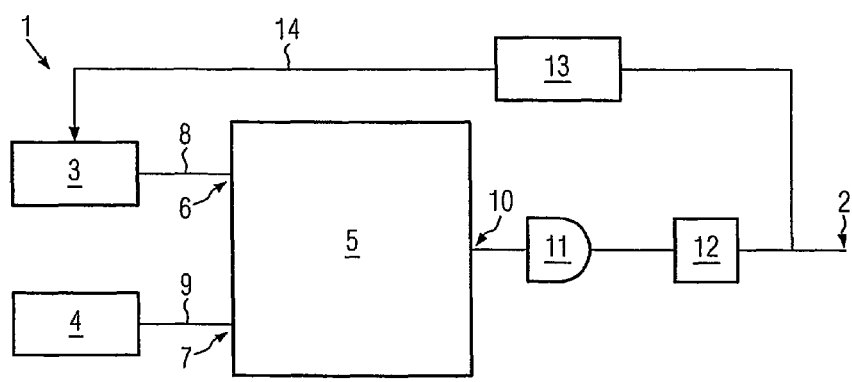
FIG. 1: a schematic representation of the general structure of an inventive system for generating a high-frequency signal.

Equal components are always provided with equal reference numerals in the figures.

FIG. 1 schematically shows the basic structure of an embodiment of a system 1 according to the invention for generating a high-frequency signal that is provided at an output 2 of the system 1. The system 1 has a first light source 3 which is a light source 3 with a spectrum with multiple optical (i.e. longitudinal) modes, that means, for example, a pulsed laser, in particular a short-pulse laser or an ultrashort-pulse laser, or a frequency comb generator. For example, as a light source 3, a passively mode-locked laser (for example coupled via the Kerr effect) could be employed, e. g. an erbium-, ytterbium- or neodymium-doped fiber laser, or a frequency comb generated by a micro-resonant cavity. In each case, the first light source 3 is a light source which emits coherent, primary optical radiation.

Furthermore, a second light source 4 is provided which also emits coherent primary light radiation. The second light source 4 can be a tunable light source, a cw laser, a source of coherent light of unknown frequency, an optical reference of known frequency, or a (further) frequency comb.

The system 1 according to the invention furthermore has a coupler and filter arrangement 5. The latter has a first connection (port) 6 for coupling in light of the first light source 3 into the coupler and filter arrangement, and a second connection (port) 7 for coupling in light of the second light source 4 into the coupler and filter arrangement. The radiation of the first light source 3 can bridge the path 8 between the first light source 3 and the first port 6 through a free-beam path and/or a fiber-optical path. Analogously, the radiation of the second light source 4 can bridge the path 9 between the second light source 4 and the second port 7 through a free-beam path and/or a fiber-optical path. It would be conceivable to provide (not represented) suited incoupling optics to introduce the radiation of the first or second light sources 3, 4, respectively, at the ports 6, 7 into the coupler and filter arrangement 5 preferably without losses.

The function of the coupler and filter arrangement 5 consists on the one hand in selectively filtering out a certain mode or a limited spectral region from the unfiltered multimode spectrum of the radiation from the first light source 3, and in superimposing this mode or this spectral region, respectively, with the light from the second light source 4. At an outlet (port) 10 of the coupler and filter arrangement, the superimposed portions of the radiation of the two light sources 3, 4 exit from the coupler and filter arrangement 5 and are directed from there onto the detector 11. The detector 11 can be in particular a photodetector, for example a photodiode or a photomultiplier tube. An electric beat signal which corresponds to the difference of the two optical frequencies of the light of the two light sources 3, 4 is generated on the detector 11. A further signal would correspond to the sum frequency of the two original frequencies. This frequency, however, is so high that it is usually not detected by a photodetector 11. Consequently, it is neglected in the generation of the high-frequency signal.

The measuring signal of the detector 11 is supplied in the form of an electric signal of a measuring unit or evaluation unit 12 which can analyze, represent and optionally process the high-frequency signal. The high-frequency signal is provided at an output 2 of the system 1.

Optionally, the generated high-frequency signal can also be supplied to a control unit 13. The control unit 13 can derive a control signal from the high-frequency signal which in turn is supplied to the first light source 3 as an input value for controlling its operation via a data line 14. The control signal can in particular be used for stabilizing the frequencies emitted from the first light source 3, for example for stabilizing an offset frequency and/or a mode distance with a frequency comb generator 3. As an alternative, the radiation of the first or second light source 3, 4 could also be stabilized such that the frequency distance of this radiation from a mode of the spectrum of the other light source remains constant.

Figure 2:
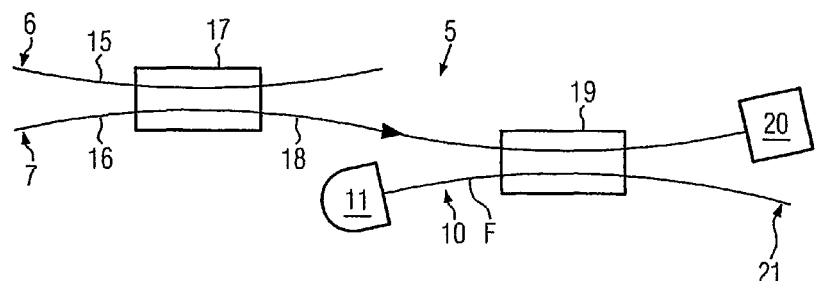
FIG. 2: a first embodiment of the coupler and filtercoupler and filter arrangement.

FIG. 2 schematically shows a first embodiment of the configuration of the coupler and filter arrangement 5 and the arrangement of the detector 11 with respect to the coupler and filter arrangement 5. In this embodiment, the radiation of the first light source 3 at the first port 6 is coupled into a first optical input fiber 15, while the radiation of the second light source 4 at the second port 7 is coupled into a second optical input fiber 16. These optical fibers 15, 16 can be—as principally any other optical fibers used in the system 1 according to the invention—polarization-maintaining (PM) fibers.

The two optical fibers 15, 16 each direct the light to a first fiber-optical coupler 17 which can be a 50:50 coupler or a coupler with any other coupling ration like 30:70 or 10:90 or a variable ratio fiber optic coupler as e.g. described in U.S. Pat. No. 5,136,669 or U.S. Pat. No. 4,634,858 A variable coupler might be useful to adjust for changing power levels and to optimize beat signal strength. In the fiber-optical coupler 17, the two optical fibers 15, 16 are so close to each other that the light from one fiber 15, 16 can couple over into the other fiber 16, 15, and vice-versa. At an output 18 of the first fiber-optical coupler 17, also in the form of an optical fiber, thus radiation is available which consists of a superimposition of the (not yet spectrally filtered) light of the first light source 3 and the light of the second light source 4.

This light now reaches, via the output fiber 18 as indicated by an arrow, a second fiber-optical coupler 19 which can again be a 50:50 coupler. A first output of the second fiber-optical coupler 19 leads via a fiber to a spectral filter 20 which is reflecting in the present case and can in particular be realized as a so-called fiber Bragg grating (FBG) 20. The spectral filter 20 serves to only reflect one single mode or at least a very small number of modes of the spectrum of the multimode light source 3 to the second fiber-optical coupler 19. All other spectral proportions of the spectrum of the first light source 3 are transmitted or absorbed by the spectral filter 20. A second output of the second fiber-optical coupler 19 also leads via a fiber to an output 21 beyond which the emitted radiation can be further used for any arbitrary purposes.

50% of the spectral proportions getting back from the spectral filter 20 onto the second fiber-optical coupler 19 are guided back from there into the input path or into the fiber 18, respectively, while 50% are guided via a further fiber F to the output 10 of the coupler and filter arrangement 5. In the present embodiment, the detector 11, however, is completely fiber-optically coupled with the second fiber-optical coupler 19, so that the output 10 is only virtually located in the output fiber F between the second fiber-optical coupler 19 and the detector 11.

The advantage of the coupler and filter arrangement 5 shown in FIG. 2 and thus altogether of the system 1 according to the invention consists in it being completely coupled by fibers from the inputs or ports 6, 7 to the output 10—in the present embodiment even to the detector 11—that means that it does not comprise any free-beam paths (at least not between the fiber-optical elements). Thus, the adjustment often required for free-beam paths is eliminated, and the efficiency and stability of the generation of the high-frequency signal is increased. With a weak power or a low intensity of the radiation of the second light source 4, the assembly according to FIG. 2, however, can be disadvantageous as the light of the second light source 4 passes once through the first fiber-optical coupler 17 and twice through the second fiber-optical coupler 19 and is weakened each time by 50%. Therefore, only 12.5% of the original luminous power arrive at the detector 11. With such a weak signal, a comparably low signal-to-noise ratio is imminent.

Figure 3:
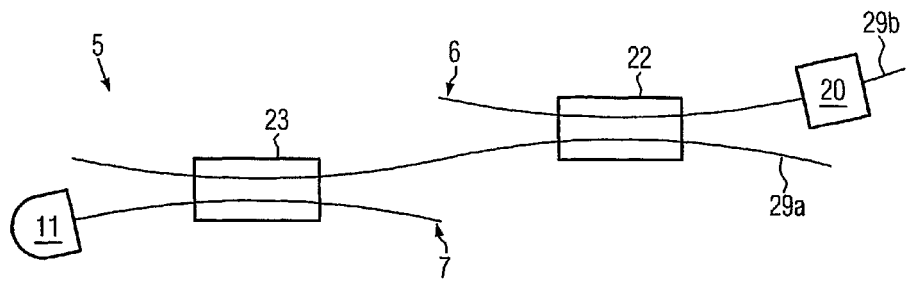
FIG. 3: a second embodiment of the coupler and filtercoupler and filter arrangement.

To improve this signal-to-noise ratio, the arrangement according to FIG. 3 can be used. Different to the embodiment according to FIG. 2, in the coupler and filter arrangement 5 according to FIG. 3, first a spectral filtering of the light of the first light source 3 takes place before this already spectrally filtered light is superimposed with the light of the second light source 4. This is achieved by the radiation of the first light source 3 being directly supplied to a reflecting spectral filter 20 via a first fiber-optical coupler 22 which can be again a fiber Bragg grating (FBG). The spectrally filtered light of the first light source 3 gets from the spectral filter 20 again onto the first fiber-optical coupler 22 and via the second input of the latter to a second fiber-optical coupler 23. The light of the second light source 4 gets at the port 7 into the coupler and filter arrangement 5 and from there without the insertion of further optical elements directly into the second fiber-optical coupler 23 which superimposes the spectrally filtered light of the first light source 3 and the light of the second light source 4 and provides it to the detector 11 at an output 10 of the coupler and filter arrangement 5 in a superimposed form.

In the embodiment according to FIG. 3, between the second port 7 for the radiation of the second light source 4 and the detector 11, consequently only one single fiber-optical coupler 23 must be passed, i. e. the light of the second light source 4 is only attenuated by 50%, and not by 87.5% as in the embodiment according to FIG. 2. Thereby, the contrast and the signal-to-noise ratio increase considerably. In the embodiment according to FIG. 3, too, the coupler and filter arrangement 5 is completely configured fiber-optically, and moreover also connected to the detector 11 completely fiber-optically.

Figure 4:
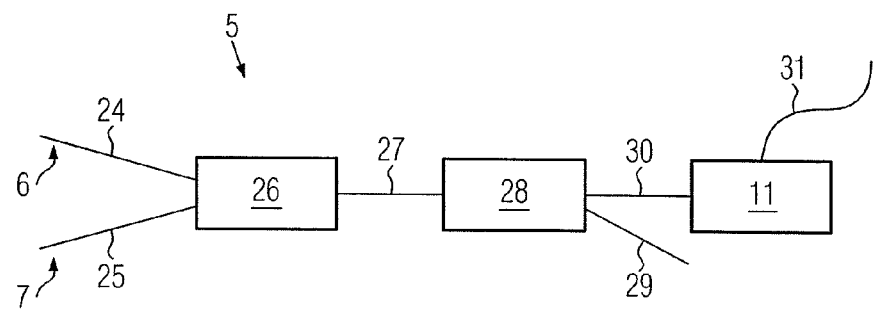
FIG. 4: a third embodiment of the coupler and filter arrangement.

FIG. 4 shows a third embodiment of a coupler and filter arrangement 5 in the system 1 according to the invention. Input fibers 24, 25 each lead from the first port 6 and the second port 7 for the radiation of the first or the second light source 3, 4, respectively, to a fiber-optical coupler or fiber coupler 26, respectively. In the fiber-optical coupler 26, the coherent radiation of the two light sources 3, 4 is superimposed. An output fiber 27 of the fiber coupler 26 leads to an also fiber-coupled spectral filter 28. In the present case, it is a transmittive spectral filter 28 in the form of a Wavelength Division Multiplexer (WDM) or an OADM. A first output fiber 29 removes the not used proportion of radiation of the first light source 3. A second output fiber 30 of the spectral filter 28 in contrast leads further to a fiber-coupled photodetector 11 from which a signal line 31 leads out to the evaluation unit 12. On the photodetector 11, the beat signal is generated as difference of the two irradiated optical frequencies. This beat signal is picked off via the signal line 31 as electric signal.

Figure 5:
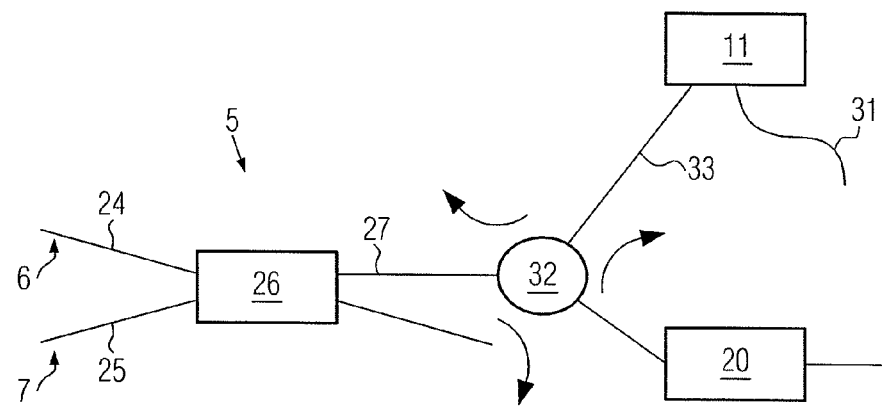
FIG. 5: a fourth embodiment of the coupler and filter arrangement.

FIG. 5 shows a fourth embodiment of a coupler and filter arrangement 5 for the system 1 according to the invention. As in the embodiment according to FIG. 4, here, too, first and second input fibers 24, 25 lead to a first fiber-optical coupler or fiber coupler 26, respectively. One of the two output fibers 27 of the fiber-optical coupler 26 in this embodiment leads to an optical circulator 32, to which consequently the light of the second light source 4 as well as the not yet spectrally filtered light of the first light source 3 are supplied via the output fiber 27.

A first output of the circulator 32 following the input of the fiber 27 leads to a spectral filter 20 fiber-optically coupled with the circulator 32, for example a fiber Bragg grating 20. This spectral filter 20 is configured such that it reflects both the light of the second light source 4 and a mode or a very narrow spectral region of the light of the first light source 3 back to the circulator 32. A subsequent second output of the circulator 32 leads via an output fiber 33 to the photodetector 11. So in this configuration, the narrow-band light reflected by the spectral filter 21 is again directed to the photodetector 11 via the circulator 32. The beat signal, i. e. the high-frequency signal, is picked off from the detector 11 via the electric connection or the signal line 31. A configuration would also be conceivable where the circulator 32 is configured to only emit the light from the spectrum of the first light source 3 via its first output to the spectral filter 20, but to direct the light of the second light source 4 arriving via the fiber 27 directly via the second output, i. e. via the output fiber 33 to the detector 11, without the detour through the spectral filter 20.

Figure 6:
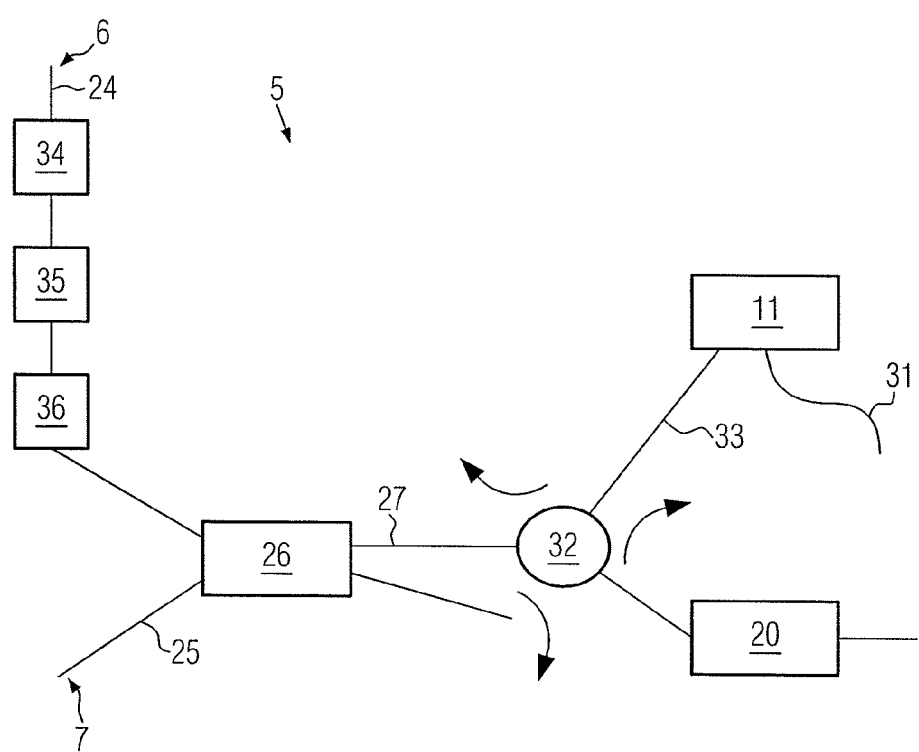
FIG. 6: a fifth embodiment of the coupler and filter arrangement.

FIG. 6 shows a fifth embodiment of a coupler and filter arrangement 5 for the system 1 according to the invention for generating a high-frequency signal. This embodiment is based on the fourth embodiment of the coupler and filter arrangement 5 shown in FIG. 5. In addition, however, now a variable attenuator or amplifier 34, a frequency shifter 35, and a variable polarization controller 36 are arranged along the first input fiber 24, i. e. between the first port 6 for coupling in the radiation of the first light source 3 and the first fiber-optical coupler 26. These components 34, 35, 36 are fiber-optically connected with each other and with the first port 6 and the fiber-optical coupler 26. The variable attenuator or variable amplifier 34 serves to approximate as closely as possible the intensities of the two frequencies arriving at the detector 11, i. e. the spectrally filtered light of the first light source 3 and the light of the second light source 4.

The polarization controller 36 may optionally comprise a fiber optic polarization splitter at the transition from a non PM to a PM fiber, this fiber optic polarization splitter having on the input side a non PM fiber, on the output side two PM fibers, with light from the input fiber being decomposed into the two polarization axes. The fiber optic polarization splitter may be provided in the polarization controller 36 in addition to a variable polarization control element.

The frequency shifter 11 can be designed as so-called acousto-optical frequency shifter (AOM). It primarily serves to shift the frequency or the frequency spectrum, respectively, of the radiation of the first light source 3 to prevent the difference between the frequencies of the two light sources and thus the frequency of the observed beat signal from getting very close to 0 Hz or to half the distance of the modes of the first light source and thus from becoming unusable for evaluation. By means of the variable polarization controller 36, the polarization of the radiation of the first light source 3 can be approximated to the polarization of the radiation of the second light source 4 to increase the contrast of the beat signal also by this measure.

Each of the three optical components, i.e. the attenuator or amplifier 34, the frequency shifter 35 and the polarization controller 36, are optional alone and in combination. Moreover, they do not necessarily have to be provided in the branch of the radiation of the first light source 3, as represented in FIG. 6. It would rather be conceivable to also dispose one or several ones of these components 34 to 36 in the path of the light of the second light source 4, i.e. along the second input fiber 25. It would also be possible that some of the components are arranged in one input branch 24, 25, and other ones of the components are arranged in the other input branch, 25, 24, i.e. for example an attenuator 34 and a frequency shifter 35 along the first input fiber 24, and a polarization controller 36 along the second input fiber 25. It would also be conceivable to provide at least one variable attenuator and/or at least one variable amplifier 34 each being along the first input fiber 24 and along the second input fiber 25.

Moreover, a variant where all or a part of the components 34 to 36 are located within the fiber-coupled coupler and filter arrangement 5, and variants where some or all of the components 34 to 36 are located outside the coupler and filter arrangement 5, that means, for example, between the respective light sources 3, 4 and the coupler and filter arrangement 5, are possible. It is moreover important that an attenuator or an amplifier 34, a frequency shifter 35 and/or a polarization controller 36 can also be provided in any other embodiment of the coupler and filter arrangements according to FIGS. 2 to 4, where also the above explained different possibilities for arranging such components 34 to 36 exist.

Figure 7:
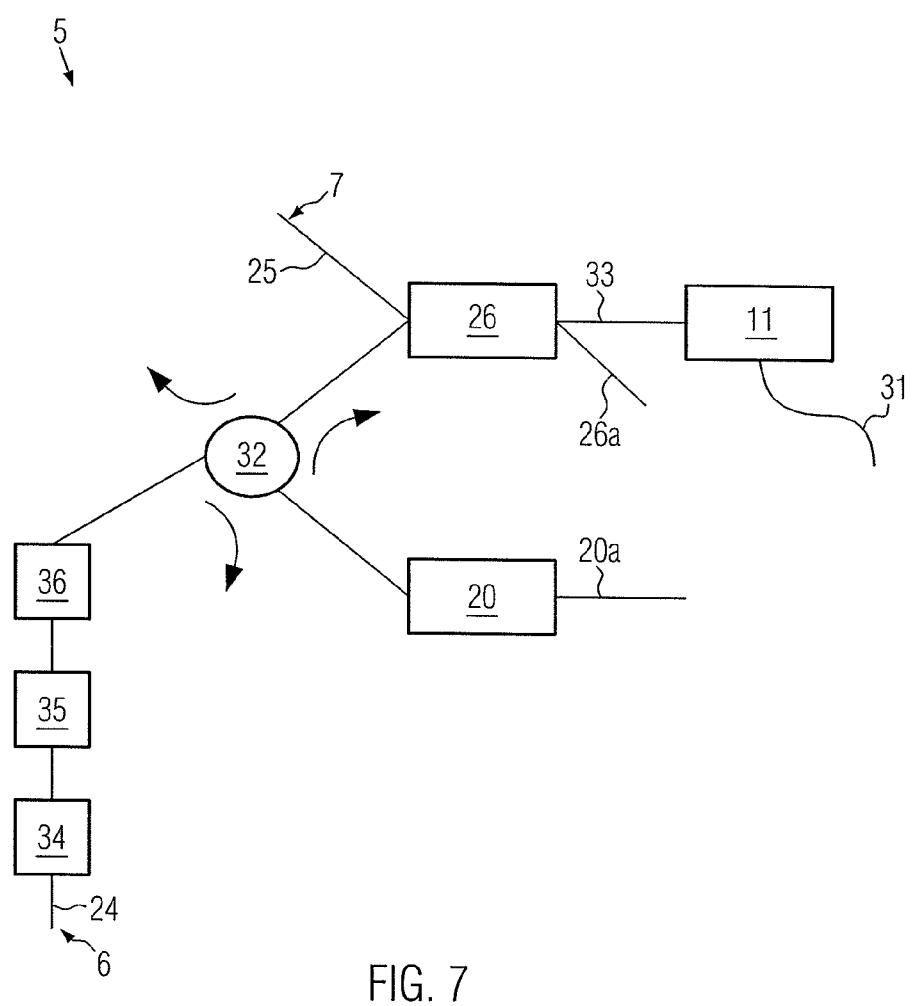
FIG. 7: a sixth embodiment of the coupler and filter arrangement.

FIG. 7 shows a sixth embodiment of a coupler and filter arrangement 5 according to the invention, where here the detector 11 allocated to this coupler and filter arrangement 5 for generating an electric beat signal is also represented. This embodiment of the coupler and filter arrangement corresponds to the fifth embodiment shown in FIG. 6, except for the assembly with the second port 7 for coupling in the light of the second light source 4, the second input port 25 and the first fiber coupler 26 having changed places with the assembly which comprises the circulator 32 and the reflecting spectral filter 20. In contrast to the situation in FIG. 6, in the coupler and filter arrangement 5 according to FIG. 7, consequently the multimode spectrum of the first light source 3 is first supplied to the filter 20 via the circulator 32 before only the spectrally filtered proportion of this multimode spectrum is supplied to the fiber coupler 26 via the circulator 32 and there superimposed by the light of the second light source 4. The light exiting at the fiber-optical outputs 20a and 26a behind the spectral filter 20 or behind the fiber coupler 26, respectively, can either be rejected or used for any other purposes.

Figure 8:
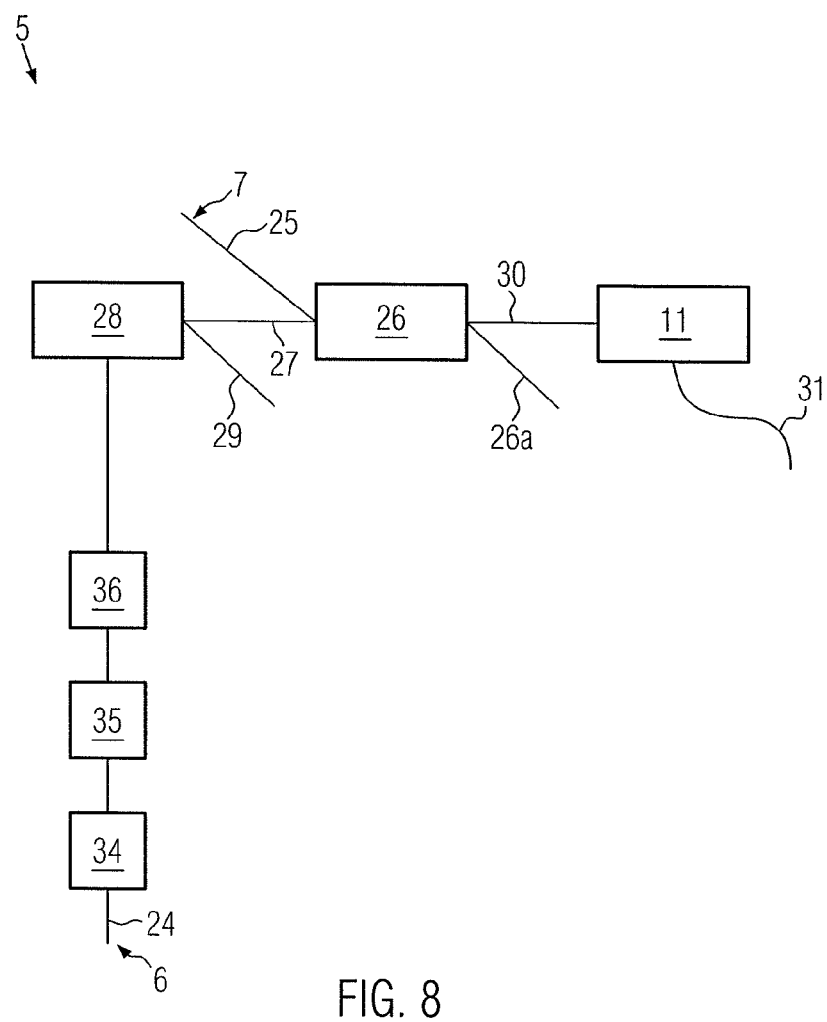
FIG. 8: a seventh embodiment of the coupler and filter arrangement.

FIG. 8 shows a seventh embodiment of a coupler and filter arrangement 5 according to the invention. This embodiment corresponds to the third embodiment of the coupler and filter arrangement 5 represented in FIG. 4, except for the following changes:

a) The transmittive spectral filter 28 for the multimode spectrum of the first light source 3 is no longer located behind the fiber coupler 26 but in the input path 24 between the first port 6 and the fiber coupler 26. So, in the fiber coupler 26, the light of the second light source 4 is superimposed by the already spectrally filtered light of the first light source 3.

b) In the first input path 24, a variable amplifier or attenuator 34, a frequency shifter 35 and a polarization controller 36 are moreover provided between the first port 6 and the spectral filter 28 one behind the other to be able to adjust or change the amplitude, frequency and/or polarization of the light of the first light source 3. Each of the three elements 34 to 36 is optional per se and in combination.

Figure 9:
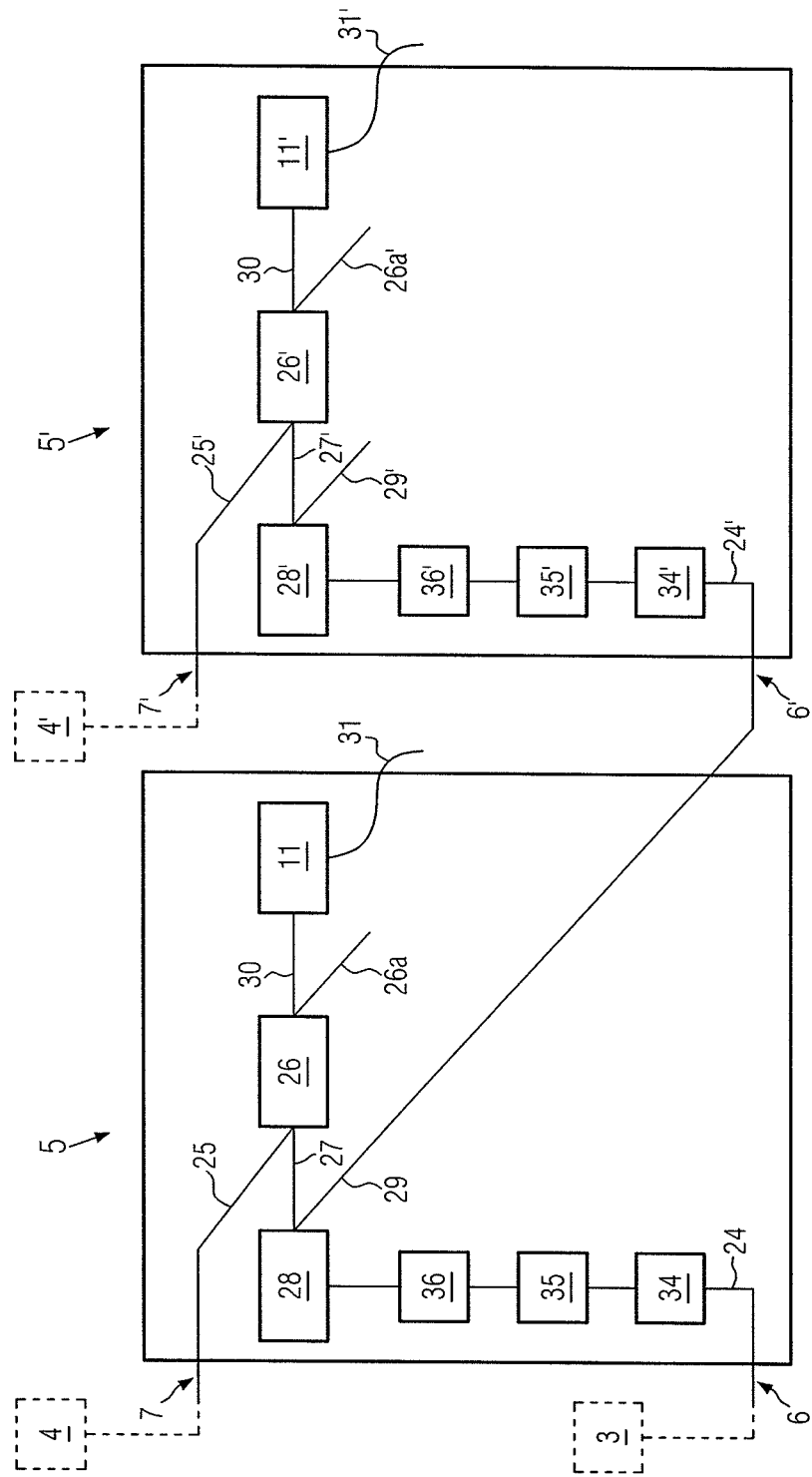
FIG. 9: an eighth embodiment with two coupler and filter arrangements connected in series or cascading, respectively.

FIG. 9 shows a further variant of the invention where two cascading coupler and filter arrangements 5, 5' are arranged one behind the other. Each of the two coupler and filter arrangements 5, 5' corresponds to the coupler and filter arrangement 5 shown in FIG. 8. So, each of the two coupler and filter arrangements 5, 5' has a first port 6, 6' and a second port 7, 7' each. The cascading of the two coupler and filter arrangements 5, 5' is effected by an optical output 29 of the first coupler and filter arrangement 5 being guided to the first input 6' of the second coupler and filter arrangement 5'. The output 29 of the first coupler and filter arrangement 5 is here a fiber exiting from the transmittive spectral filter 28 and not leading to the detector 11 of the first coupler and filter arrangement 5. It ideally guides the complete spectral proportion of the multimode spectrum of the first light source 3 which is not guided from the spectral filter 28 towards the detector 11 to generate a beat signal there with the light of the second light source 4.

The transmittive spectral filter 28' of the second coupler and filter arrangement 5' is configured to filter out a narrowband, for example mono-mode spectral proportion, from this remaining spectral proportion. This reaches a fiber-optical coupler 26' via an optical fiber 27' and is there superimposed by the light of a further reference light source 4'. The light of this further reference light source 4' is irradiated via the second port 7' into the second coupler and filter arrangement 5'. In a specific example, the first light source 3 could be a frequency comb generator, the second light source 4 could be an Nd:YAG laser at a wavelength of 532 nm, and the further light source 4' could be a HeNe laser at a wavelength of 543 nm. In this manner, two electric beat signals of different frequencies could be generated on the two detectors 11, 11' of the cascading coupler and filter arrangements 5, 5'.

A cascading of two coupler and filter arrangements 5, 5' for generating two beat signals of different frequencies from the light of one single multimode light source 3 is also possible with the other embodiment variants of the coupler and filter arrangements 5. In order not to irradiate here the light of the first reference light source 4 into the second coupler and filter arrangement 5', it is appropriate to either insert a filter between the two coupler and filter arrangements 5, 5' for filtering out the light of this first reference light source 4, or else to only direct the already spectrally filtered light of the first light source 3, which is not yet superimposed by the light of the reference light source 4, from the first coupler and filter arrangement 5 into the second coupler and filter arrangement 5', or even the not yet filtered light of the first light source 3. In the embodiment according to FIG. 3, in the output fiber 29a behind the first fiber coupler 22, there would still be available the not yet filtered, original spectrum of the first light source 3, while in the output fiber 29b behind the reflecting spectral filter 20, the excessive region of the spectrum of the first light source 3 transmitted in the spectral filtering is available. Each of the two output fibers 29a, 29b of the coupler and filter arrangement 5 according to FIG. 3 could therefore lead to a first connection or port 6' of a second coupler and filter arrangement 5'.

It would also be conceivable to connect or cascade in this manner even more than two coupler and filter arrangements one behind the other to generate even more than two beat signals of different frequencies from the light of the multimode light source 3.

Starting from the represented embodiments, the system 1 according to the invention or the coupler and filter arrangement 5 can also be changed in another way. For example, the use of so-called "balanced detection" at the detector 11 would be conceivable for suppressing noise. "Balanced detection" is known from DE 196 33 428 A1, reference being explicitly made to its disclosure in this respect. By (mechanical) expansion of the fiber Bragg grating 20, the spectrally filtered frequency could be tuned. This could be optionally done variably in the operation of the system 1. As a polarization controller 36, in particular fiber-coupled polarization controller elements make sense. These can be so-called fiber squeezers (mechanical or piezo-operated) or mechanical-geometrical polarization controllers. Instead of a fiber-coupled attenuator or amplifier 34, a fiber-optical coupler 17, 23, 26 with an adjustable overcoupling ratio could also be used. It could be realized by bringing two tapered optical fibers (so-called tapers) to a variable distance with respect to each other within it.

The fiber-optical couplers can be melt couplers (fiber splitters or fiber combiners), fiber-optical couplers with internal micro-optical components, or polarization couplers.

Irrespective of the configuration of the input fibers 15, 16, 24, 25 at the first port 6 and the second port 7 as PM or non-PM fibers, it may be advantageous in each embodiment if at least the fiber sections leading into the first fiber-optical coupler 17, 23, 26 are polarization maintaining optical fibers.

The invention claimed is:

1. A system for generating a beat signal, comprising:
   a frequency comb as a first light source with a spectrum comprising a plurality of equidistant optical modes,
   a second light source,
   at least one coupler and filter arrangement with a first port for coupling in light from the first light source, and a second port for coupling in light from the second light source,
   a detector adapted to receive, from the coupler and filter arrangement, light of the first light source and light of the second light source, and to output a beat frequency of the light of the first and second light sources,
   the coupler and filter arrangement comprising:
      a spectral filter for filtering out one or several modes from the multimode spectrum of the first light source, and
      a first fiber-optical coupler for coupling the light of the second light source and the light of the first light source, the coupler and filter arrangement being furthermore configured to be fiber-optical,
   wherein at least input fibers at the first port and the second port and/or fiber sections leading into the first fiber-optical coupler are polarization maintaining optical fibers.

2. The system according to claim 1, wherein the detector is fiber-optically coupled to the coupler and filter arrangement.

3. The system according to claim 1, wherein the spectral filter comprises a reflecting spectral filter.

4. The system according to claim 1, wherein the spectral filter comprises a transmitting spectral filter.

5. The system according to claim 1, wherein the coupler and filter arrangement comprises an optical circulator.

6. The system according to claim 5, wherein the optical circulator is disposed between the first fiber-optical coupler and the spectral filter, and between the spectral filter and the detector.

7. The system according to claim 1, wherein in addition to the first fiber-optical coupler, a second fiber-optical coupler is provided.

8. The system according to claim 5, wherein an output of the optical circulator or the second fiber-optical coupler leads to the spectral filter.

9. The system according to claim 1, wherein between the second port and the detector, only one single fiber-optical coupler is arranged.

10. The system according to claim 1, wherein a variable attenuator, a variable amplifier, a frequency shifter, and/or a polarization controller for light of the first light source and/or light of the second light source are provided.

11. The system according to claim 10, wherein a variable attenuator, a variable amplifier, a frequency shifter and/or a polarization controller are disposed in front of one of the first or second ports or within the coupler and filter arrangement.

12. The system according to claim 1, wherein in the coupler and filter arrangement, all fibers are polarization-maintaining fibers.

13. The system according to claim 1, wherein the detector is configured for balanced detection.

14. The system according to claim 1, wherein a control unit is provided and configured to stabilize the first or the second light source to a fixed, mutual frequency distance using the generated beat signal.

15. The system according to claim 1, wherein several coupler and filter arrangements are provided, a separate reference light source being allocated to each coupler and filter arrangement.

16. The system according to claim 3, wherein the reflecting spectral filter is a fiber Bragg grating.

17. The system according to claim 4, wherein the transmitting spectral filter is a Wavelength Division Multiplexer or an Optical Add-Drop Multiplexer.

* * * * *